United States Patent
Gupta et al.

(10) Patent No.: US 10,382,567 B2
(45) Date of Patent: Aug. 13, 2019

(54) SYSTEMS AND METHODS FOR MANY-TO-ONE BI-DIRECTIONAL AUTO-DISCOVERY

(71) Applicant: Infinera Corporation, Annapolis Junction, MD (US)

(72) Inventors: Parveen Kumar Gupta, Bangalore (IN); Rama Kant Pathak, Bahraich (IN); Saurabh Kumar, Menlo Park, CA (US)

(73) Assignee: Infinera Corporation, Sunnyvale, CA (US)

( * ) Notice: Subject to any disclaimer, the term of this patent is extended or adjusted under 35 U.S.C. 154(b) by 54 days.

(21) Appl. No.: 14/986,495

(22) Filed: Dec. 31, 2015

(65) Prior Publication Data

US 2017/0142207 A1    May 18, 2017

(51) Int. Cl.
*H04L 29/08* (2006.01)
*H04L 12/755* (2013.01)
*H04Q 11/00* (2006.01)

(52) U.S. Cl.
CPC ............ *H04L 67/16* (2013.01); *H04L 45/021* (2013.01); *H04Q 11/0067* (2013.01); *H04Q 2011/0073* (2013.01); *H04Q 2011/0079* (2013.01)

(58) Field of Classification Search
CPC ......... H04L 67/16; H04L 5/0055; H04L 5/14; H04L 45/021; H04Q 11/0067
See application file for complete search history.

(56) References Cited

U.S. PATENT DOCUMENTS

| | | | | |
|---|---|---|---|---|
| 6,654,802 B1* | 11/2003 | Oliva | .................... | H04L 41/12 370/221 |
| 2002/0126342 A1* | 9/2002 | Wetzel | ............... | H04Q 11/0005 398/45 |
| 2003/0020976 A1* | 1/2003 | Krishnaswamy | .. | H04Q 11/0062 398/5 |
| 2012/0033678 A1* | 2/2012 | Page | ....................... | H04L 45/28 370/401 |
| 2013/0028080 A1* | 1/2013 | Rao | ..................... | H04L 47/6215 370/230 |
| 2014/0036920 A1* | 2/2014 | McCormick | ............ | H04L 49/25 370/392 |
| 2014/0075085 A1* | 3/2014 | Schroder | ............. | G06F 13/4022 710/317 |

* cited by examiner

*Primary Examiner* — Albert T Chou
(74) *Attorney, Agent, or Firm* — David L. Soltz

(57) ABSTRACT

A method of many-to-one auto-discovery between modules includes: a source (sender) module sends the same source-ID on all its connected ports (many). The module may not know on which port the ID is sent. A sink (receiver) module is capable of receiving IDs on its port (one). The sink port identifies the association-ID (AID) of one end of the association (between sender and receiver). The association may be established based on each module discovering the sink AID of the sender in both directions (bi-directional). Both directions may be required for the source signal to get received on a respective sink. The source signal may be sent asynchronously in each direction.

20 Claims, 4 Drawing Sheets

SYSTEMS AND METHODS FOR MANY-TO-ONE BI-DIRECTIONAL AUTO-DISCOVERY

CLAIM OF PRIORITY

The present Application for Patent claims priority to Indian Provisional Application No. 6123/CHE/2015 entitled "Bi-Directional Auto-Discovery Protocol" filed Nov. 13, 2015, and assigned to the assignee hereof and hereby expressly incorporated by reference herein.

FIELD OF DISCLOSURE

This disclosure relates generally to auto-discovery in a communication network and more specifically, but not exclusively, to auto-discovery in a network element of a communication network.

BACKGROUND

In current communication networks, auto-discovery capabilities of management systems typically pertain to network elements as a whole, i.e., the ability to automatically detect which network elements are connected to a network and to discover their type and physical and logical configuration. Service- and network-layer information, on the other hand, is generally not discovered but provisioned and provided by the organization operating the network and services. However, this does not provide any benefit when trying to ascertain or incorporate a module or component of a network element.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for associating modules of network elements in a communication network includes: sending a first signal from a first port to a second port communicatively coupled to the first port, the first signal configured to uniquely identify a first module; sending a second signal from the second port to the first port, the second signal configured to uniquely identify a second module; receiving the second signal at the first port; updating a first data table of the first module with a second identification of the second module based on the second signal; sending a third signal from the first port, the third signal configured to uniquely identify the first port; sending a fourth signal from the second port to the first port, the fourth signal configured to uniquely identify the second port; and updating the first data table with a fourth identification of the second port based on the fourth signal.

In another aspect, a non-transitory computer readable medium containing program instructions for causing a processor to perform a process including: sending a first signal from a first port to a second port communicatively coupled to the first port, the first signal configured to uniquely identify a first module; sending a second signal from the second port to the first port, the second signal configured to uniquely identify a second module; receiving the second signal at the first port; updating a first data table of the first module with a second identification of the second module based on the second signal; sending a third signal from the first port, the third signal configured to uniquely identify the first port; sending a fourth signal from the second port to the first port, the fourth signal configured to uniquely identify the second port; and updating the first data table with a fourth identification of the second port based on the fourth signal.

In still another aspect, an apparatus includes: means for sending a first signal from a first port to a second port communicatively coupled to the first port, the first signal configured to uniquely identify a first module; means for sending a second signal from the second port to the first port, the second signal configured to uniquely identify a second module; means for receiving the second signal at the first port; means for updating a first data table of the first module with a second identification of the second module based on the second signal; means for sending a third signal from the first port, the third signal configured to uniquely identify the first port; means for sending a fourth signal from the second port to the first port, the fourth signal configured to uniquely identify the second port; and means for updating the first data table with a fourth identification of the second port based on the fourth signal.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
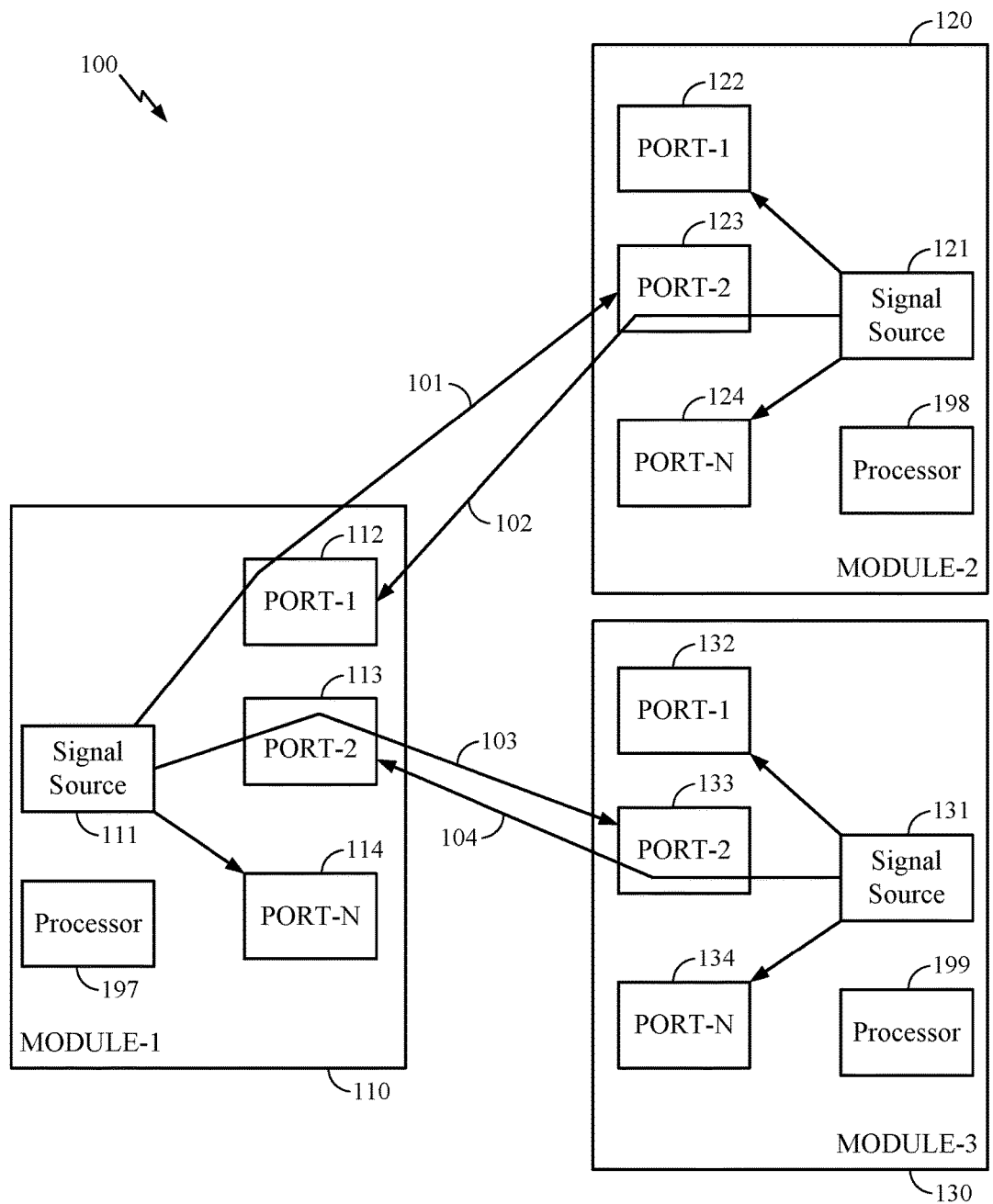
FIG. 1 illustrates an exemplary fiber connection between modules of a network element in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. Auto-discovery is a process by which optical communication between two module/ports is discovered and validated. For example, in any network element (NE):

At module level each port may be identified with a unique-id referred as source-ID. In one example, this source-ID may be 4-bytes long, consisting of 1-byte of port-id and 3-bytes of module-id. Optically, a NE may be capable of sending only 4-bytes of msg-data because of hardware constraints. It should be understood that the source-ID may be more bytes or less bytes as desired and may be unique to each type of module suitable for use in a NE.

At system level every port may be identified with a unique-id referred to as AID or ASSOC-ID (for example, <chassis-id, shelf-id, slot-id, port-id>). The AID may be unique within same network element and not unique across other NEs. As part of auto-discovery process, along with port discovery and validation, each port may be configured to learn each other's AID, so that system level communication may be established between the two end-points within the communication network. Same source-ID is broadcasted on all ports of the source module. Source-ID is unique per module and not per port. In our example of 4-bytes, for bidirectional AD 3-bytes identifies module is only used and 1-byte identifying as port is not used (shared resource for all ports). 3-bytes module-id and 1-byte of port convention may be used in all unidirectional as well bi-directional AutoDiscovery ID format. As such, the source-ID is not limited to this format.

FIG. 1 illustrates an exemplary connection between modules using duplex fiber. In this example, two ports are connected with a duplex fiber pair. As shown in FIG. 1, a network element 100 may include a first module 110, a second module 120, and a third module 130. The first module 110 may include a plurality of ports such as a signal source 111 (e.g. a laser or transmitter), a first port 112, a second port 113, a third port 114, and a processor 197. Each port 112-114 is coupled to the signal source 111 to send a signal. The second module 120 may include a plurality of ports such as a signal source 121 (e.g. a laser or transmitter), a first port 122, a second port 123, a third port 124, and a processor 198. Each port 122-124 is coupled to the signal source 121 to send a signal. The third module 130 may include a plurality of ports such as a signal source 131 (e.g. a laser or transmitter), a first port 132, a second port 133, a third port 134, and a processor 199. Each port 132-134 is coupled to the signal source 131 to send a signal. As shown, the first port 112 is connected to the second port 123 by a first fiber 101 and a second fiber 102 for bi-directional communication of signals supplied by the signal source 111 and the signal source 121. Similarly, the second port 113 is connected to the second port 133 by a third fiber 103 and a fourth fiber 104 for bi-directional communication of signals supplied by the signal source 111 and the signal source 131. While the ports are shown connected by a pair of fibers, it should be understood that a single fiber configured for bi-directional communication may be used. While three modules with three ports apiece, it should be understood that a network element may include more or less than three modules and that each module may include more or less than three ports. While the modules are shown as part of a single NE, it should be understood that each module may be part of a different NE and may be co-located or located remote from each other. The processors 197-199 may be an ASIC or similar circuit configured to perform the actions and steps described herein and it should be understood that although three processors 197-199 are shown, these may be a single processor/circuit or multiple processors/circuits located on the modules or as a separate component.

There are multiple ports in each module and each port is fiber connected to a port on a different module. All modules are capable of sending signals. A port that sends a signal is referred as source and the port that receives the signal is referred as sink. That means with bi-directional fiber port connectivity, each port acts as both a source and a sink. In one exemplary method, a source (sender) module sends the same source-ID on all its connected ports. The source module may not know on which port the ID is sent. A sink (receiver) module is capable of receiving IDs on its port. When the sink port receives a source signal from a source port containing the source-ID, the sink port may then identify the AID of one end of the association (the logical connection between sender and receiver). The complete association may be established based on each module discovering the sink AID of the sender in both directions (bi-directional). Both directions may be required for the source signal to be received on a respective sink. The source signal may be sent asynchronously in each direction.

In another example of the disclosure, two modules module-1 and module-2 are connected with fiber pair from port-1 on module-1 to port-2 on module-2. First, source 1 & sink-1 software modules are defined for port-1 of module-1 and source-2 & sink-2 software modules are defined for port-2 of module-2. In this example, the module-1 source id may be source-ID1 and module-2 source id may be source-ID2. Next, the source-ID1 may be broadcasted in direction-1: source-1 to sink-2. Next, the source-ID2 may be broadcasted in direction-2: source-2 to sink-1. The NE may provide a software (SW) communication mechanism to exchange events between modules. Until ports are discovered, a module may not know the communication-ID of the connected port. One approach includes each module running a communication server with the communication-ID as the source-ID. This same source-ID is sent over the fiber to the connected port. On receiving the source-ID, the receiving module establishes communication with the source module. As part of the system configuration, the system may have pre-defined associations. The sequence of discovery events may vary based on whether the association is auto-discovered or is pre-provisioned, as described below.

Figure 2:
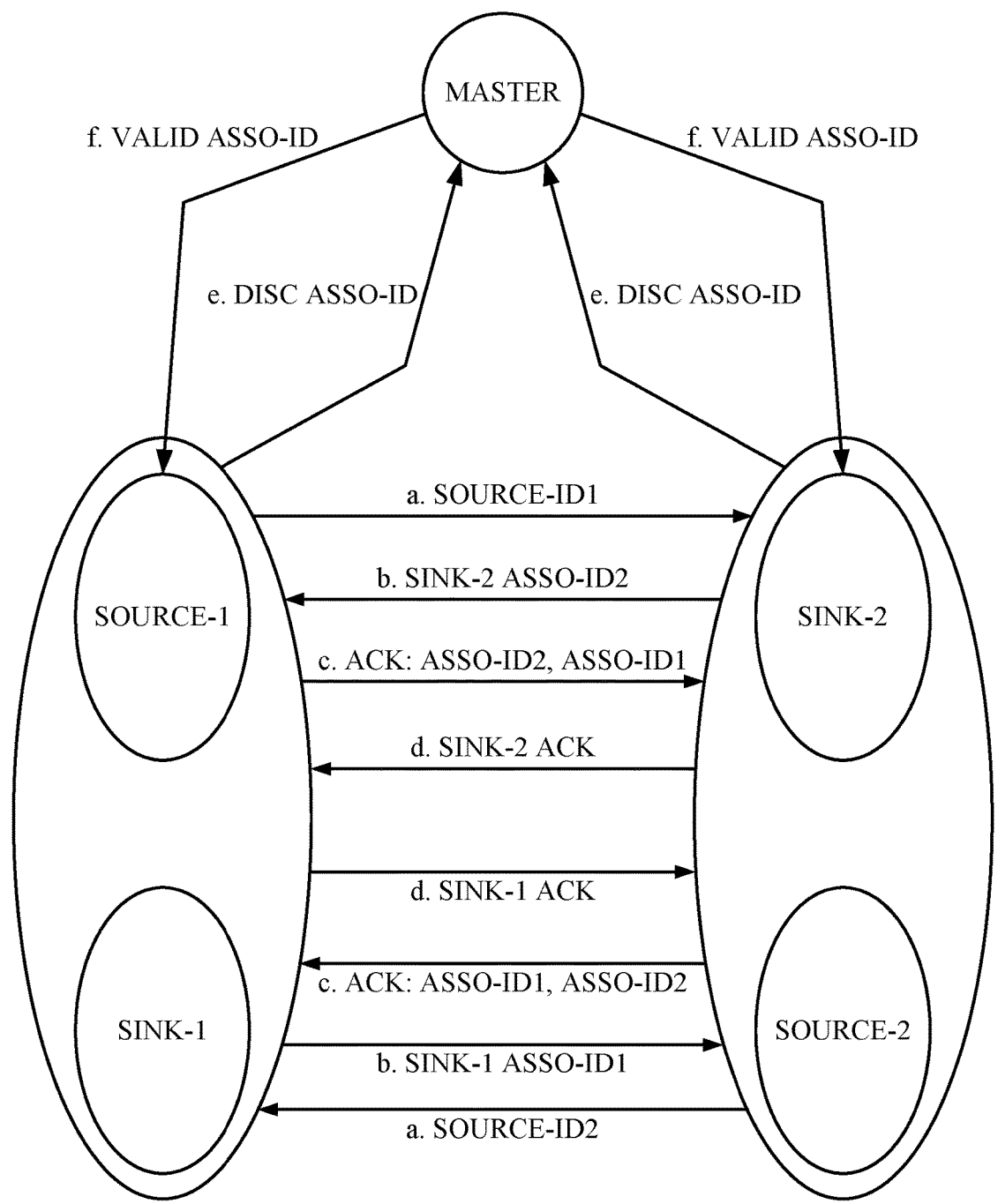
FIG. 2 illustrates an exemplary automatically discovered association in accordance with some examples of the disclosure.

As illustrated in FIG. 2, if the association is not provisioned, a master is used to validate the discovered association. If all other services related requirements are satisfied, the discovered association becomes the provisioned association. Steps (a-to-f) in FIG. 2 are described below with a local port including module-1 port-1 (source-1, sink-1) and a remote port including module-2 port-2 (source-2, sink-2):

a. Each source-1 and source-2 broadcast their module source-ID in each direction asynchronously using the fiber connections. (optical communication).

b. sink-1 on getting source-ID2 on port-1, updates its lookup table. Sink-1 knows its own ASSO-ID1 and notify its <ASSO-ID1, source-ID1> to source-2. (SW Communication). At this time, module-1 port-1 has the following information:

| remote source-ID | remote AID | local AID |
|---|---|---|
| source-ID2 | <not known> | ASSO-ID1 |

And it responds with its own information to module-2 via SW communication. This information includes: <ASSO-ID1, source-ID1>. In the reverse direction, module-2 will also send below information to module-1, on getting the source-ID1 via optical communication: <ASSO-ID2, source-ID2>.

c. module-1 on receiving <ASSO-ID2, source-ID2> information from sink2, does a lookup in the data table. If a matching entry of remote source-ID2 is found, it fills the missing information (remote aid) in table. At this time, port-1 has following information:

| remote source-ID | remote AID | local AID |
|---|---|---|
| source-ID2 | ASSO-ID2 | ASSO-ID1 |

This way module 1 port-1 knows association <ASSO-ID2, ASSO-ID1>, and it sends final ACK with complete association information. If entry of source-ID2 is not found (optical communication from source-2 has not happened yet), it stores the information as:

| remote source-ID | remote AID | local AID |
|---|---|---|
| source-ID2 | ASSO-ID2 | <not known> | and waits for optical communication from source-2 to complete the table.
d. Similarly, Module-2 port-2 fills its data table and association establishes, and sends ACK.
e. On association discovery, each sink-1 and sink-2 notify the association to master. (SW Communication).
f. master validates association and notify the valid-ASSO-ID to each sink port. (SW Communication).

Figure 3:
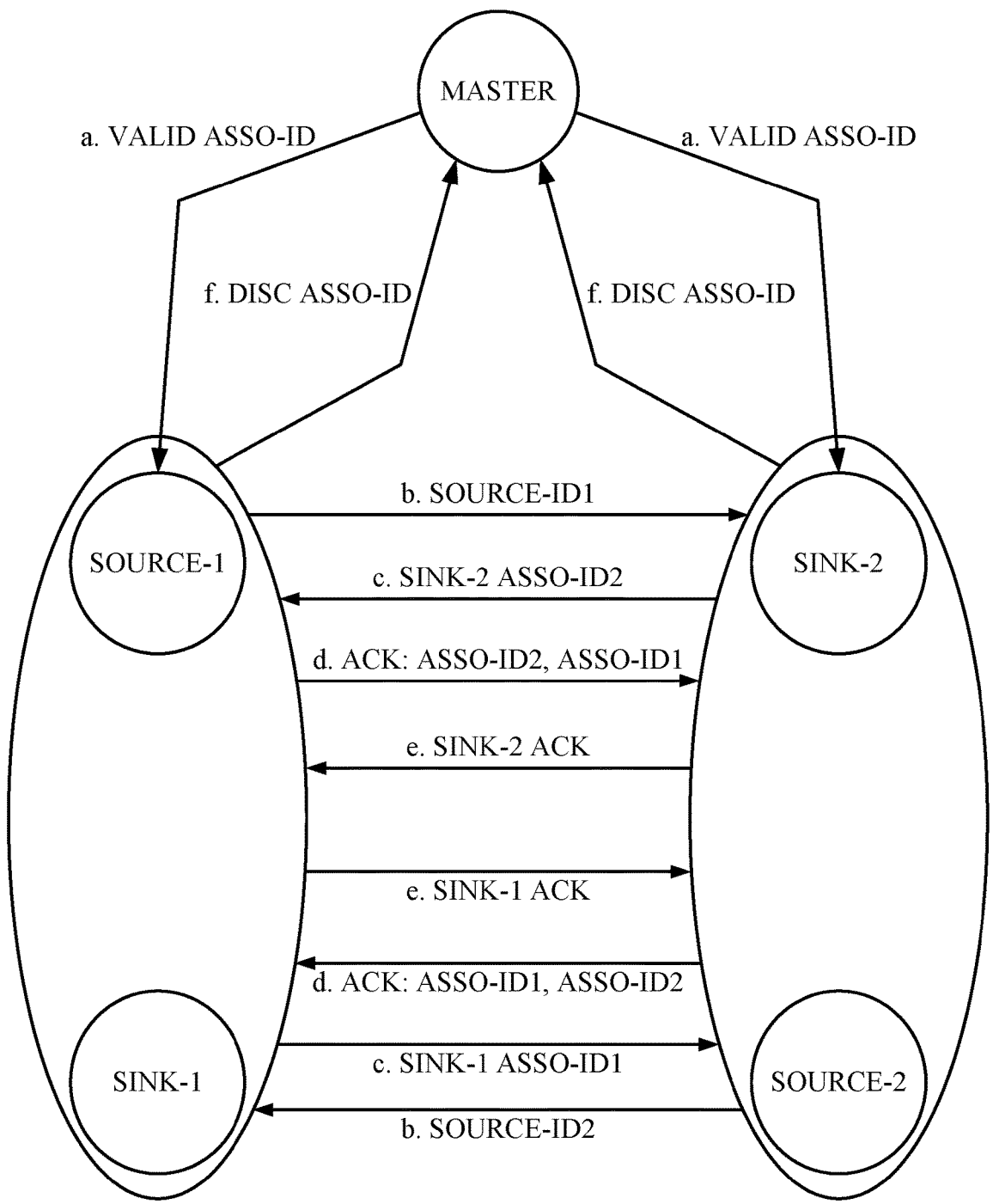
FIG. 3 illustrates an exemplary pre-provisioned association in accordance with some examples of the disclosure.

As illustrated in FIG. 3, if the association is already provisioned, master notifies the same to source and sink. In this case, to complete association each source and sink validates associations locally and completes association. Steps (a-to-f) in FIG. 3 are described below with a local port including module-1 port-1 (source-1, sink-1) and a remote port including module-2 port-2 (source-2, sink-2):
a. master notify pre-provision association to each sink port. (SW Communication).
b. Each source-1 and source-2 broadcast their module source-ID in each direction asynchronously using the fiber connections. (optical communication).
c. sink-1 on getting source-ID2, updates the table. At this time, module-1 port-1 has following information:

| remote source-ID | remote AID | local AID |
|---|---|---|
| source-ID2 | <not known> | ASSO-ID1 |

And it responds with its own information to module-2 via SW communication. This information includes: <ASSO-ID1, source-ID1>. In the reverse direction module-2 will also send below information to module-1, on getting the source-ID1 via optical communication: <ASSO-ID2, source-ID2>.

d. module-1 on receiving <ASSO-ID2, source-ID2> information from sink2, does lookup in the data table. If a matching entry of remote source-ID2 is found, the missing information (remote AID) is filled in the table. At this time, port-1 has following information:

| remote source-ID | remote AID | local AID |
|---|---|---|
| source-ID2 | ASSO-ID2 | ASSO-ID1 |

This way module-1 port-1 knows association <ASSO-ID2, ASSO-ID1> and sends a final ACK with complete Association information. If the entry of source-ID2 is not found (optical communication from SOURCE-2 has not happened yet), it stores the information as:

| remote source-ID | remote AID | local AID |
|---|---|---|
| source-ID2 | ASSO-ID2 | <not known> | and waits for optical communication from SOURCE-2 to complete the table.
e. Similarly, Module-2 port-2 fills its data table and association established, and sends ACK.
f. On association discovery, each sink port does local validation with pre-provision association. If association matches then notify the same to master. (SW Communication).

Figure 4:
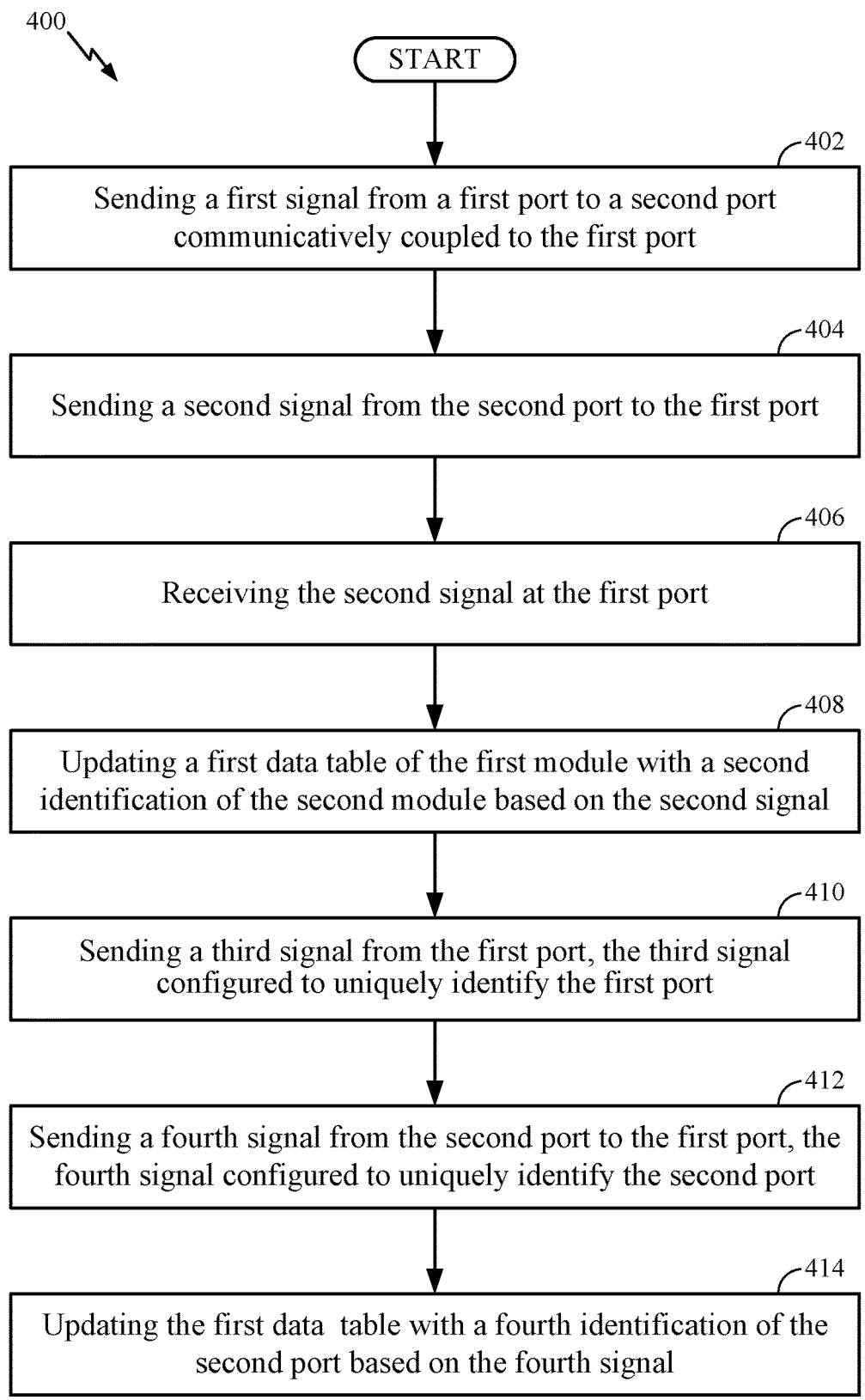
FIG. 4 illustrates an exemplary method in accordance with some examples of the disclosure.

FIG. 4 illustrates an exemplary method in accordance with some examples of the disclosure. As shown, the partial process begins in step 402 with sending a first signal from a first port to a second port communicatively coupled to the first port, the first signal configured to uniquely identify a first module. Next in step 404, the partial process continues with sending a second signal from the second port to the first port, the second signal configured to uniquely identify a second module. Next in step 406, the partial process continues with receiving the second signal at the first port. Next in step 408, the partial process continues with updating a first data table of the first module with a second identification of the second module based on the second signal. Next in step 410, the partial process continues with sending a third signal from the first port, the third signal configured to uniquely identify the first port. Next in step 412, the partial process continues with sending a fourth signal from the second port to the first port, the fourth signal configured to uniquely identify the second port. Next in step 414, the partial process concludes with updating the first data table with a fourth identification of the second port based on the fourth signal.

Examples of the network elements mentioned above (e.g. device 100) may include routers or switches, such as Infinera's DTN-X platform, that may have multiple functionalities like L0 wavelength division multiplexing (WDM) transport capabilities, L1 digital OTN switching capabilities, and L2 packet switching capabilities. The network 100 may be optimized by enabling the packet switching feature in network devices using protocols such as MPLS-TP and switching LSP's, and packet switching in the network core can be performed by the devices.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims— other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
   sending a first signal from a first port of a first module of a first network element to a second port of a second module of a second network element communicatively coupled to the first port, the first signal uniquely identifying the first module, the first signal comprising a source-ID, the source-ID including a first port identifier and a first module identifier associated with the first module;
   sending a second signal from the second port to the first port, the second signal uniquely identifying the second module, the second signal comprising an ASSOC-ID, the ASSOC-ID including a second port identifier associated with the second module, a slot identifier that identifies a slot of a shelf in which the second module is provided, the shelf being included in a chassis, the ASSOC-ID further including a slot identifier that identifies the slot, a shelf identifier that identifies the shelf, and a chassis identifier that identifies the chassis;
   receiving the second signal at the first port;
   updating a first data table of the first module with a second identification of the second module based on the second signal;
   sending a third signal from the first port, the third signal uniquely identify the first port;
   sending a fourth signal from the second port to the first port, the fourth signal uniquely identify the second port; and
   updating the first data table with a fourth identification of the second port based on the fourth signal.

2. The method of claim 1, further comprising:
   receiving the first signal at the second port;
   updating a second data table of the second module with a first identification of the first module based on the first signal; and
   updating the second data table with a third identification of the first port based on the third signal.

3. The method of claim 1, wherein the sending the second signal occurs when the first signal is received at the second port.

4. The method of claim 1, wherein in the first signal and the second signal are analog signals.

5. The method of claim 1, wherein the third signal and the fourth signal are digital signals.

6. The method of claim 1, wherein the first port is communicatively coupled to the second port over a duplex fiber medium.

7. The method of claim 1, further comprising sending the first signal from each port of a plurality of ports of the first module.

8. The method of claim 1, further comprising verifying the third identification with a remote controller.

9. The method of claim 1, wherein the first module is located in a first network element and the second module is located in a second network element remote from the first network element.

10. A non-transient computer readable medium containing program instructions for causing a processor to perform a process comprising:
    sending a first signal from a first port to a second port communicatively coupled to the first port, the first signal uniquely identifying a first module configured to be within a communication network of network elements, the first signal comprising a source-ID, the source-ID including a first port identifier and a first module identifier associated with the first module;
    receiving, at the first port, a second signal from the second port, the second signal uniquely identifying a second module configured to be within the communication network of network elements, the second signal comprising an ASSOC-ID, the ASSOC-ID including a second port identifier associated with the second module, a slot identifier that identifies a slot of a shelf in which the second module is provided, the shelf being included in a chassis, the ASSOC-ID further including a slot identifier that identifies the slot, a shelf identifier that identifies the shelf, and a chassis identifier that identifies the chassis;
    updating a first data table of the first module with a second identification of the second module based on the second signal;
    sending a third signal from the first port, the third signal uniquely identify the first port;
    receiving, at the first port, a fourth signal from the second port to the first port, the fourth signal uniquely identify the second port; and
    updating the first data table with a fourth identification of the second port based on the fourth signal.

11. The non-transient computer readable medium of claim 10, further comprising:
    receiving the first signal at the second port;
    updating a second data table of the second module with a first identification of the first module based on the first signal; and
    updating the second data table with a third identification of the first port based on the third signal.

12. The non-transient computer readable medium of claim 10, further comprising sending the second signal, and wherein sending the second signal occurs when the first signal is received at the second port.

13. The non-transient computer readable medium of claim 10, wherein the first signal and the second signal are analog signals.

14. The non-transient computer readable medium of claim 10, wherein the third signal and the fourth signal are digital signals.

15. The non-transient computer readable medium of claim 10, further comprising sending the first signal from each port of a plurality of ports of the first module.

16. The non-transient computer readable medium of claim 10, further comprising verifying the third identification with a remote controller.

17. The non-transient computer readable medium of claim 10, wherein the first module is located in a first network element of the network elements and the second module is located in a second network element of the network elements remote from the first network element.

18. An apparatus comprising:
a first circuit configured to send a first signal from a first port to a second port communicatively coupled to the first port, the first signal uniquely identifying a first module, the first signal comprising a source-ID, the source-ID including a first port identifier and a first module identifier associated with the first module;
the first circuit configured to send a second signal from the second port to the first port, the second signal uniquely identifying a second module, the second signal comprising an ASSOC-ID, the ASSOC-ID including a second port identifier associated with the second module, a slot identifier that identifies a slot of a shelf in which the second module is provided, the shelf being included in a chassis, the ASSOC-ID further including a slot identifier that identifies the slot, a shelf identifier that identifies the shelf, and a chassis identifier that identifies the chassis;
the first circuit configured to receive the second signal at the first port;
the first circuit configured to update a first data table of the first module with a second identification of the second module based on the second signal;
the first circuit configured to send a third signal from the first port, the third signal uniquely identify the first port;
the first circuit configured to send a fourth signal from the second port to the first port, the fourth signal uniquely identify the second port; and
the first circuit configured to update the first data table with a fourth identification of the second port based on the fourth signal.

19. The apparatus of claim 18, further comprising:
the first circuit configured to receive the first signal at the second port;
the first circuit configured to update a second data table of the second module with a first identification of the first module based on the first signal; and
the first circuit configured to update the second data table with a third identification of the first port based on the third signal.

20. The apparatus of claim 18, wherein the first circuit configured to send the second signal when the first signal is received at the second port.

* * * * *